United States Patent [19]

Simopoulos et al.

[11] Patent Number: 4,595,861
[45] Date of Patent: Jun. 17, 1986

[54] POWER SUPPLIES FOR ELECTROLUMINESCENT PANELS

[75] Inventors: Nicholas T. Simopoulos; George N. Simopoulos; Gregory N. Simopoulos, all of Dayton, Ohio

[73] Assignee: Luminescent Electronics, Inc., Dayton, Ohio

[21] Appl. No.: 635,770

[22] Filed: Jul. 30, 1984

[51] Int. Cl.[4] .............................................. H05B 37/02
[52] U.S. Cl. .................................. 315/169.3; 315/221; 315/224; 363/55; 363/56
[58] Field of Search .................. 315/209 R, 224, 225, 315/221, 169.3; 363/55, 56; 361/92, 101

[56] References Cited

U.S. PATENT DOCUMENTS

| | | | |
|---|---|---|---|
| 4,004,188 | 1/1977 | Cooper | 315/224 X |
| 4,148,088 | 4/1979 | Meroni | 363/55 X |
| 4,319,164 | 3/1982 | Tulleners | 315/169.3 X |
| 4,380,044 | 4/1983 | Parr | 363/56 X |
| 4,453,193 | 6/1984 | Huang et al. | 363/56 X |
| 4,498,128 | 2/1985 | Peterson et al. | 363/56 X |

FOREIGN PATENT DOCUMENTS

| | | | |
|---|---|---|---|
| 54-5532 | 1/1979 | Japan | 363/55 |
| 58-56111 | 4/1983 | Japan | 363/55 |

Primary Examiner—David K. Moore
Assistant Examiner—Vincent DeLuca
Attorney, Agent, or Firm—Biebel, French & Nauman

[57] ABSTRACT

DC operated power supplies for electroluminescent lamps are self-inhibited from further oscillations and thus are current limited in the event that a failure occurs in an EL lamp which results in the EL lamp being shorted. Single ended and push/pull transformer power supplies are disclosed, and a transformerless solid state power supply is disclosed utilizing a voltage multiplier, and an inhibitor circuit at the output of the voltage multiplier responsive to substantial voltage drop upon the occurrence of a shorting of the EL lamp, to inhibit further oscillations and operations of the circuit.

10 Claims, 3 Drawing Figures

POWER SUPPLIES FOR ELECTROLUMINESCENT PANELS

BACKGROUND OF THE INVENTION

This invention relates to power supplies for electroluminescent (EL) panels, and more particularly to power supplies which effectively are inhibited or blocked and thus shut down in the event of a short in the panel circuit or a panel failure. The application is further directed to particular power supplies for such panels including a transformerless power supply.

The use of electroluminescent panels, particularly in the automotive and aircraft field, has required the development of DC operated power supplies for such panels, which can conveniently take a low voltage source of DC power available, and provide an operating voltage for the electroluminescent panels involved. For example, EL panels have come into widespread use in light aircraft having only a DC power system, for enunciator panels or for other illumination devices, and in automobiles as a design feature such as for opera lights, or for backlighting of radio controls or the like. There has accordingly arisen a need for low cost, lightweight and dependable power supplies which can operate on a low voltage direct current source, such as 12 volts DC, and provide dependable power for the electroluminescent lamp or panel.

A further requirement has been that of providing a power supply which is blocked or inhibited and is thus failsafe on the occurrence of an electrical or mechanical malfunction in the panel itself, causing the panel to short. Shorting of the EL panel may result by reason of improper construction of the panel itself or mechanical abuse or catastrophic failures. In the past, such shorting has tended to place an uncommonly high load upon the inverter power supply, to the point where the power supply may fail, and in failing, may cause an electrical hazard, such as an overload, or a source of localized heating, which can under certain circumstances cause a fire hazard.

There is further a need for dependable EL power supplies which are lightweight, and which can be made in a highly compact form, at relatively low cost. For example, there is a need for a power supply which can be formed entirely on a printed circuit board or on an EL lamp itself, and thus there is a requirement for a power supply which is transformerless and made up entirely of solid state low profile elements.

SUMMARY OF THE INVENTION

This invention is directed to fail-safe power supplies which become inhibited and essentially shut themselves down without failure of the power supply, in the event that the EL panel or its immediate circuit, for whatever reason, becomes short circuited. The invention is further directed to specific embodiments of such power supplies with and without a step-up transformer. In one form of the invention, the power supply consists of an inverter circuit incorporating an autotransformer, with the electroluminescent panel forming a capacitive load on the transformer winding, with the circuit being arranged such that shorting of the panel results in a reflected low impedance to appear across the normally high collector impedance circuit to the point that oscillations are no longer possible. The current normally drawn by the circuit dropping to a minimum value. Single ended and push/pull embodiments are shown. In a further form of the invention, a power supply is disclosed which is transformerless and which employs a voltage multiplying circuit driving a self-sustaining output circuit, which output circuit is inhibited in such a manner that shorting of the panel results in a starvation of the power supply to the output circuit, and a cessation of operation of the oscillator, with the result that little or no current flows. Each of the embodiments is characterized by the fact that shorting of the EL panel results in the load on the DC power source dropping to a minimum, in a fail-safe condition.

It is accordingly an important object of this invention to provide a power supply for EL panels, which power supply is not subject to overload conditions upon the shorting of the panel, and more particularly which power supplies are effectively inhibited from further operation in the event of panel failure.

A still further object of the invention is the provision of specific preferred embodiments of the invention incorporating an autotransformer, and a further embodiment of the invention incorporating a voltage multiplier.

A further object of the invention is the provision of power supplies for EL lamps which are fail-safe in operation.

These and other objects and advantages of the invention will be apparent from the following description, the accompanying drawings, and the appended claims.

DESCRIPTION OF THE PREFERRED EMBODIMENTS

Figure 1:
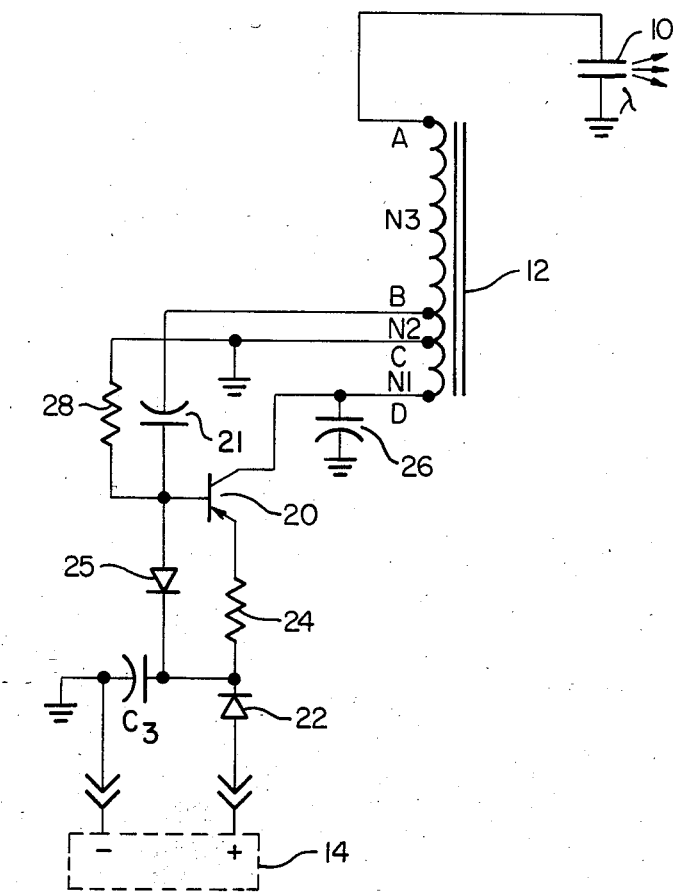
FIG. 1 is a wiring diagram of one embodiment of the invention.

Referring to the figures of the drawings which illustrate preferred embodiments of the invention, one form of a self-inhibiting power supply for an EL lamp is shown in FIG. 1. The electroluminescent lamp or panel is illustrated generally by the capacitance 10 and is shown as being connected to top A of winding N3 of an autotransformer 12. The power source or input to the power supply may be a 12 volt battery or the like, and is designated by the reference numeral 14. The transformer 12, in addition to the winding N3, includes windings N1 and N2 defined by taps B, C and D, with a common grounded tap C. Winding N1 is in the collector circuit of a PNP drive transistor 20, while winding N2 is coupled to the base circuit through capacitor 21. Power is applied to and through a series connected diode 22 and resistor 24, and the emitter of transistor 20.

A second diode 25 is connected from the base to the junction of the diode 22 and the resistor 24, and permits the positive half of the feedback cycle to be returned to the emitter. A capacitor 26 may be connected from terminal D to ground, to prevent spurious oscillations and to tune the primary winding N1.

It will be noted that the windings of the transformer 12 are and remain essentially at DC ground potential since tap C is grounded. The resistor 28 in the feedback circuit from terminal B to the base is selected so as to start the circuit oscillations, and limit the direct current drawn when the output terminal A is at zero DC potential, in the event that the electroluminescent panel 10 for any reason becomes grounded or shorted.

The frequency of oscillations depends upon the maximum flux density, which in turn depends upon the ampere turns of the primary winding N1 and the reflected capacitance of EL panel 10 into the primary. The voltage fed to the base of the transistor 20 is in phase with the collector voltage, and starts and maintains oscillations in normal operation.

The feedback winding N2 has in the order of half the turns of the primary winding N1, and the diode 25 is connected in such a manner as to allow the positive half of the feedback cycle to return to the emitter of the transistor 20. The negative half cycle is rectified by the base emitter junction of the transistor, which in turn causes the transistor to pass more current from the emitter to the collector. During operation, under no load condition, the transistor draws nearly its maximum current.

When a load, such as the EL panel 10, is applied between the output terminal A and ground, which uses less energy than the energy being fed to the base emitter junction, the power supply continues to operate. However, in the event that the panel 10 becomes shorted or otherwise dissipates excessive energy, the oscillator circuit is substantially detuned and insufficient energy is fed through capacitor 21 into the base to establish or maintain oscillations. In effect, the oscillator becomes "starved" for current and the current which the transistor 20 now passes will be determined by the value of resistance 28, which provides a small forward bias current, which in turn causes a very low collector current. The resistor 24 is a resistor of small value, to limit the maximum current which the power supply can draw from the main power source 14. Accordingly, in the event that a short circuit occurs in the EL panel 10 or the leads to the panel, or even in the transformer 12, the power supply shown in FIG. 1 virtually shuts down and idles at very low current input compared to the normal operating input current.

As an example, and in no way intending to limit the scope of the invention as defined in the appended claims, a single transistor power supply has been made in accordance with the teachings of the invention as shown in FIG. 1 and draws 300–350 milliamps from a 12.6 volt power source under full load. The output was 20 milliamps at 140 V, 200 Hertz. However, in the event that the output terminal A of the transformer 12 becomes shunted to ground potential, such as by the shorting of the EL lamp 10 or otherwise, the DC current that is drawn goes to a very low level in the order of 10–12 milliamperes. The resistor 28 in the base circuit of the transistor 20 in combination with the current limiting resistor 24, may be considered as current limiting means for inhibiting or blocking oscillations in the event that the transformer secondary winding N3 or the EL panel 10, or the lead to the panel becomes shorted or otherwise becomes grounded, thereby automatically shutting down the power supply. The following table is a list of circuit elements which have actually been used in the example of the invention as described above in connection with FIG. 1 of the application:

| C26, C21 | 10 uf |
| C3 | 220 uf WVDC |
| R-28 | 68K ¼ watt ± or 5% resistor |
| R-24 | 5 3 watt resistor |
| Q-20 | 2W2955T Transistor (PNP) |

| -continued | |
|---|---|
| T-12 | 3/6" square stack EI-186 |
| | $N_1$ = 50 turns No. 32 AWG |
| | $N_2$ = 27 turns No. 32 AWG |
| | $N_3$ = 200 turns No. 38 AWG |

Figure 2:
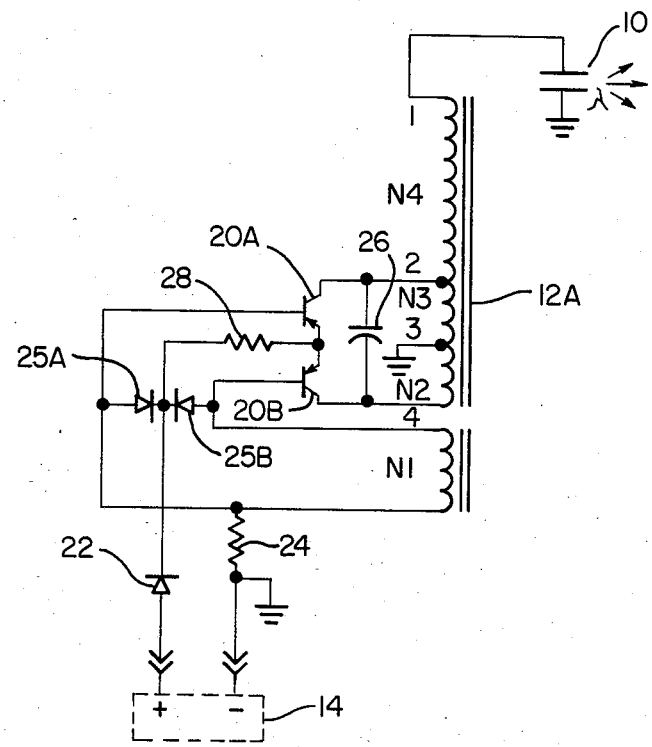
FIG. 2 is a wiring diagram of a modified form of the power supply shown in FIG. 1.

FIG. 2 shows a push/pull version of the current limiting circuit of this invention, according to the embodiment of FIG. 1 employing the principles used in the single transistor power supply of FIG. 1. For convenience, parts in the embodiment of FIG. 2 which correspond more or less directly to the same parts used in the embodiment of FIG. 1 have been identified with like reference numerals.

A pair of PNP drive transistors 20a and 20b are connected in push/pull relation with their emitters connected in common through the current limiting resistor 28. The transformer 12a differs from the transformer 12 in that the feedback winding N1 is isolated from the secondary winding which now includes push/pull windings N2 and N3, center tapped, and connected respectively to the collectors of the transistors 20a and 20b. The secondary winding N4 is connected to the EL lamp or panel 10. The terminals of the feedback winding N1 of the embodiment of FIG. 2 are connected to the respective bases of the transistors 20a and 20b. As shown, the starting resistor 24 is connected to the bases of the transistors, while the semi-conductor diodes 25a and 25b provide a return path for the positive going potential appearing at each of the respective bases on the alternate half-cycle portions of the feedback potential. Again, the purpose of the resistor 24 is to limit current which the circuit can draw in the event of a short.

A unique feature of the circuit of FIG. 2 is the fact that the feedback winding N1 is not center tapped, thus reducing the cost. Further, like the power supply circuit of FIG. 1, the secondary winding of the transformer 12a is maintained essentially at a DC ground potential.

Further, when a short appears across the windings N2, N3, N4 or the EL panel 10 to ground, a very low impedance is reflected across the feedback winding N1 of the transformer 12a which substantially decreases the energy fed in phase to the bases of the push/pull pair of transistors and, in effect, prevents oscillations of the circuit. In essence, oscillations are prevented, and only the current caused by reason of the transistor forward bias provided through the starting resistor 24 will flow through the circuit. This forward bias, in a typical instance, is in the order of 30 to 100 times less than when the power is being fed to a properly operating EL panel.

The table which follows provides a specific example, without limitation, of a parts list for a power supply made in accordance with the embodiment of FIG. 2:

| Q20A, 20B 2N6727 | PNP transistor |
| R-24 | 5 ½ watt ± 5% resistor |
| R-28 | 47K ¼ watt ± 5% resistor |
| C-26 | 10 uf 59 WVDC electrolytic capacitor |
| T-12 A | Transformer |
| | $N_1$ = 50 turns No. 38 AWG wire |
| | $N_2$ = 85 turns No. 38 AWG wire |
| | $N_3$ = 85 turns No. 38 AWG wire |
| | $N_4$ = 1850 turns No. 42 AWG wire |

Figure 3:
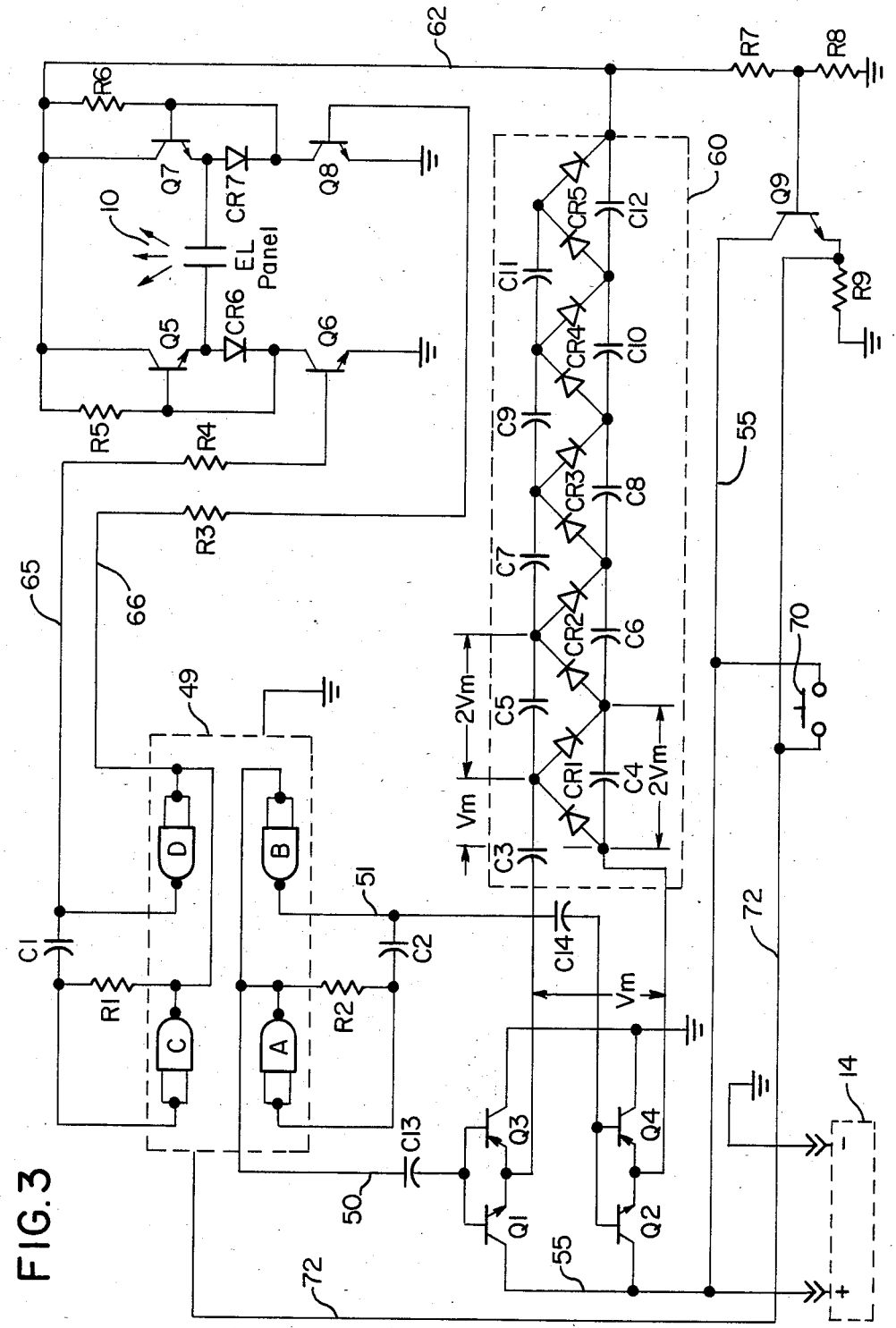
FIG. 3 is a wiring diagram of a transformerless embodiment of the power supply.

A further embodiment is in the form of a transformerless, short circuit protected EL lamp power supply, as shown in FIG. 3. The circuit of FIG. 3 utilizes a high frequency oscillator which supplies power to a voltage multiplier circuit which, in turn, supplies high voltage to the driver transistors for the panel. A relatively lower frequency oscillator controls the application of the high voltage provided by the voltage multiplier at a substantially lower frequency for the purpose of maintaining the longevity of the panel. A CMOS circuit 49 includes NAND gates A, B, C, and D. Thus, NAND gates A and B constitute a high frequency oscillator having a frequency in the order of approximately 20 kilohertz, for example. The outputs of the oscillator defined by the NAND gates A and B appears on lines 50 and 51 in the form of a push/pull square wave, which wave is fed through coupling capacitors C13 and C14 to the bases of output driver pairs Q1–Q3 and Q2–Q4. The output driver pairs receive their power direct from the DC voltage source 14 through a common line 55, and the output thereof designated as Vm is applied to the input of a voltage multiplier 60.

The voltage multiplier 60 consists of diodes CR1 through CR5 and capacitors C3 through C12, arranged in a voltage multiplier ladder. The output square wave potential $V_m$ applied to the power amplifiers Q1–Q4 and applied by these amplifiers to the input of the voltage multiplier, is very nearly the same as the applied DC potential by the source 14, which may be 12.6 volts, for example. The output of the voltage multiplier 60 appears on line 62 and may be, for example, in the order of 140 volts and is fed to a voltage divider consisting of resistors R7 and R8. It is also fed to the input of EL lamp totem pole drivers Q5 through Q8. It will be seen that drivers Q5 and Q6 are arranged in totem pole driving fashion as are drivers Q7 and Q8, with the respective input terminals of the EL lamp 10 connected across the emitters of drivers Q5 and Q7. The multiplied voltage on line 62 is applied to the collectors of Q5 and Q7 for powering the lamp 10.

The totem pole driver pairs Q5–Q6 and Q7–Q8 are arranged in push/pull and are controlled by a relatively lower frequency oscillator consisting of NAND gates C and D, within the same integrated circuit 49. The oscillator defined by the NAND gates C and D, however, is designed to operate at a substantially lower frequency which may be in the order of 1000 Hertz, to maintain the longevity of the EL panel. The output of the low frequency oscillator is a square wave applied by lines 65 and 66 through resistors R3 and R4 to the respective bases of control devices Q6 and Q8.

Means for starting and maintaining oscillations includes a momentary starting switch 70, which, when depressed, applies input DC power from line 55 to a line 72 connected to the input of the CMOS circuit 49. The base of an emitter follower Q9 is connected to the junction of the voltage divider resistors R7 and R8, and when conducting, continues to apply CMOS oscillator operating power to the line 72. The emitter follower Q9 derives its collector DC power from the external power source 14 on line 55. Oscillations then begin in the oscillator which energizes the DC voltage multiplier 60, which now feeds the emitter follower Q9 which in turn maintains a DC power source for the CMOS integrated circuit. Thus, when the momentary switch 70 is released, the oscillations will continue unless and until the output of the voltage multiplier is overloaded for whatever reason, usually associated with failure of the EL lamp, as previously defined.

Thus, if the EL lamp or panel 10 becomes shorted for any reason, such as due to mechanical abuse or improper construction, the load which is imposed through the drivers Q5 and Q7 to the voltage multiplier circuit 60 immediately and substantially reduces the output voltage. The reduction of the output voltage on line 62 correspondingly reduces the voltage at the base of the emitter follower Q9, which causes the emitter follower to cut off which in turn cuts the system off completely. Accordingly, the emitter follower Q9 and the voltage divider R7 and R8 provides means defining an inhibitor circuit which is operable, with failure or excessive load reflected at the panel 10, to shut down the power supply for the EL and thus prevent either catastrophic loss or damage to the power supply or to the surrounding equipment or material. To restart the system after such shutdown, it is only necessary to correct the problem which caused the shutdown, and repress the start button 70. Normal shutdown may be provided by the insertion of a momentary cutoff switch in line 62 which would thereby interrupt the power to the emitter follower and cause the power supply to shut down.

By way of example only, and without limitation, the following specifications for a circuit in accordance with FIG. 3 have been successfully employed:

| | | |
|---|---|---|
| IC = | HEF4011BT | quad dual input NAND gate |
| Q1, Q2, Q9 = | MMBT2222 | NPN transistor |
| Q3, Q4 = | MMBT2907 | PNP transitor |
| Q5, Q6, Q7, Q8 = | MMBTA 43 | NPN high voltage transistor |
| CR1, CR2, CR3, CR5 = | MMBD 7000 | Dual silicon semiconductor diodes |
| CR6, CR7 = | MMBD 914 | single silicon semiconductor diode |
| C1 0.1 uf | | |
| C2 0.0047 uf | | |
| C3, C4, C5, C6, C7, C8, C9, C10, C11, C12 - 1 uf chip tantalum capacitors MATSUO 265L2002-105-MI | | |
| C13, C14 = | 0.68 uf chip capacitor | |
| R1 = | 36K resistor R2 = 3K resistor | |
| R3, R4, R8 = | 10K resistor | |
| R5, R6 = | 150K resistor | |
| R7 = | 47K resistor | |
| R9 = | 20K resistor | |

It will accordingly be seen that this application provides both transformer and transformerless safety oriented electronic power supplies for driving EL lamps, and which protect themselves as well as their associated circuitry against excessive current loads in the event of a problem or failure at the EL lamp. The hybrid circuit shown in FIG. 3 has the particular advantage of compactness, and since no transformer is needed, the entire circuit of FIG. 3 may conveniently be fabricated directly to an EL lamp itself or to a small circuit board or chip associated with the EL lamp.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A drive circuit for an electroluminescent panel or the like defining a capacitive load, said drive circuit operating from a low voltage source of DC power and comprising:

an autotransformer having a plurality of windings defined by taps along said autotransformer and including a voltage step-up winding for driving connection to said electroluminescent panel; and oscillator means connected to said low voltage source and comprising at least one transistor connected to associated windings of said autotransformer, the oscillation of said oscillator means being responsive to the reflected capacitance of said electroluminescent panel such that said oscillator means is detuned by a short circuit of said electroluminescent panel and will no longer oscillate.

2. A drive circuit for an electroluminescent panel as claimed in claim 1 wherein said autotransformer is driven single ended by a single transistor.

3. A drive circuit for an electroluminescent panel as claimed in claim 1 wherein said autotransformer is driven push/pull by a pair of transistors.

4. A drive circuit for an electroluminescent panel as claimed in claim 1 wherein said autotransformer is maintained at DC ground potential during operation.

5. A drive circuit for an electroluminescent panel as claimed in claim 1 wherein said autotransformer includes a feedback winding flux coupled to said plurality of windings for driving said at least one transistor, which feedback winding reflects a substantially reduced driving voltage to the power transistor upon the occurrence of a short circuit in the electroluminescent panel, thus inhibiting further oscillations of the oscillator.

6. A drive circuit for an electroluminescent panel as claimed in claim 1 further comprising a capacitor connected across one or more of said plurality of windings to tune said autotransformer and prevent spurious oscillations.

7. A driver circuit for an electroluminescent panel, said driver circuit operating from a low voltage source of DC power and comprising:

a voltage multiplier circuit having a low voltage input and a high voltage output;

amplifier means connected between said low voltage source of DC power and the input of said multiplier;

a first oscillator connected to said amplifier means for activating said amplifier means at a first frequency;

driver means connected between the high voltage output of said multiplier circuit and an electroluminescent panel;

a second oscillator connected to said driver means for activating said driver means at a second frequency which is substantially less than said first frequency whereby the life expectancy of said electroluminescent panel is extended;

voltage sensor means connected to the high voltage output of said voltage multiplier circuit; and power control means connected to said voltage sensor means, said low voltage source of DC power, and said first and second oscillators for removing power from said first and second oscillators if the level of the output voltage of said voltage multiplier falls below a selected level whereby said driver circuit is shut down and thereby protected if said electroluminescent panel fails in a short circuit mode.

8. A driver circuit for an electroluminescent panel as claimed in claim 7 wherein said power control means comprises means for starting said driver circuit by momentarily applying power to said first and second oscillators.

9. A driver circuit for an electroluminescent panel as claimed in claim 8 wherein said power control means comprises a transistor having base, emitter and collector terminals, said base terminal connected to said voltage sensor means, said collector terminal connected to said low voltage source of DC power and said emitter terminal connected to said first and second oscillators and to said low voltage source of DC power through a resistor to form an emitter follower; and wherein said means for starting said driver circuit comprises a momentary make switch connected across the collector and emitter terminals of said transistor.

10. A driver circuit for an electroluminescent panel as claimed in claim 9 wherein said first frequency is approximately twenty times said second frequency.

* * * * *